United States Patent [19]

Fukao et al.

[11] Patent Number: 5,246,766
[45] Date of Patent: Sep. 21, 1993

[54] THERMAL RECORDING MEDIUM

[75] Inventors: Ryuzo Fukao, Suita; Tsunemi Oiwa, Osaka; Shuichi Wada, Settsu; Akio Shimizu, Takatsuki; Seiichi Asada, Mishima; Hisanobu Mikamo, Ibaraki; Akira Kato, Takarazuka, all of Japan

[73] Assignee: Hitachi Maxell Ltd., Ibaraki, Japan

[21] Appl. No.: 565,458

[22] Filed: Aug. 10, 1990

[30] Foreign Application Priority Data

Aug. 11, 1989 [JP] Japan ................... 1-209214
May 30, 1990 [JP] Japan ................... 2-140270

[51] Int. Cl.⁵ .................................. B32B 9/00
[52] U.S. Cl. ........................... 428/209; 428/195; 428/207; 428/208; 428/423.1; 428/424.4; 428/425.9; 428/429; 428/900
[58] Field of Search ............... 428/195, 209, 210, 913, 428/914, 207, 423.1, 423.4, 425.9, 429, 903; 252/62.63, 62.54, 62.55, 62.59, 62.6, 62.62

[56] References Cited

U.S. PATENT DOCUMENTS 4,847,132 7/1989 Takao et al. ............... 428/137
5,019,550 5/1991 Suzuki et al. ............... 428/195

FOREIGN PATENT DOCUMENTS 0250227 12/1987 European Pat. Off. .
WO/8600575 1/1986 World Int. Prop. O. .

OTHER PUBLICATIONS

Patent Abstracts of Japan, vol. 13, No. 133 (M-809) (3481) Apr. 4, 1989, and JP-A-63 299982 (Kuraray K.K.) Dec. 7, 1988.
Patent Abstracts of Japan, vol. 13, No. 100 (M-805) (3448) Mar. 9, 1989, and JP-A-63 288784 (Toray Industries Incorporated) Nov. 25, 1988.
Patent Abstracts of Japan, vol. 12, No. 267 (M-722) (3114) Jul. 26, 1988, and JP-A-63 47196 (Fuji Photo Film Company Limited) Feb. 27, 1988.

Primary Examiner—Patrick J. Ryan
Assistant Examiner—W. Krynski
Attorney, Agent, or Firm—Birch, Stewart, Kolasch & Birch

[57] ABSTRACT

A thermal recording medium including a base layer containing a resin having a functional group which chemically bonds with a metal having a low melting point, such as Sn-Pb alloy, and a thermal recording layer made of a thin film with low resistivity of a low melting point metal formed on said base layer such that when a part of the thermal recording layer is heated, the heated part melts and perforates to record information.

22 Claims, No Drawings

THERMAL RECORDING MEDIUM

BACKGROUND OF THE INVENTION

Field of the Invention

The present invention relates to a thermal recording medium. More particularly, the present invention relates to a thermal recording medium which comprises a base layer and a thermal recording layer made of a thin film of a low melting point metal which is formed on the base layer wherein a part of the thermal recording layer is heated to melt and become perforated to record information, which is excellent in printing clarity and durability of printing clarity.

Description of the Related Art

A thermal recording medium which comprises a base layer and a thermal recording layer made of a thin film of a low melting point metal formed on the base layer, wherein a part of the thermal recording layer is heated to become melted and perforated to record information is used in various fields for indicating information, such as an amount of money, a number or a date, because of good long-time stability.

This type of thermal recording medium is disclosed in Japanese Patent Kokai Publication No. 199284/1984 and comprises a substrate, a magnetic recording medium formed on the substrate, a thermal recording layer made of a thin film of a nonmagnetic metal or alloy formed on the magnetic recording medium, and a coloring layer provided between the magnetic layer and the thermal recording layer or a coloring layer and a protecting layer on the thermal recording layer, or an adhesive layer between the adjacent layers.

In general, on a surface of the substrate made of a plastic material (e.g. nylon, cellulose diacetate, cellulose triacetate, polystyrene, polyethylene, polypropylene, polyester, polyimide and polycarbonate), the magnetic layer is formed, and on the magnetic layer, the thin film of a low melting point metal (e.g. tellurium, tin, indium, aluminum, lead and zinc) is formed by vacuum deposition or plating. A part of the low melting point metal layer is melted and perforated by means of a heating means, such as a thermal head, a laser beam or hot stamping to form a visible information, such as bar codes or OCR characters. The information formed on the thermal recording medium has far better thermal stability than informations formed through a reaction of a chemical color former.

However, the conventional thermal recording medium cannot develop prints having satisfactory clarity. That is, the conventional thermal recording medium has various drawbacks that edges of printed characters are blurred, dot area of the print is small, printing density is low, and the printing area is small.

The present inventors investigated causes for such drawbacks and found the following facts.

When adhesion of the thin metal film to the base layer is weak, the character edges tend to be blurred. Namely, when the thin metal film is heated with the thermal head, a non-printing part adjacent to a printing part of the metal film is melted or peeled off from the base layer to some extent because of heating or strain caused by heating at a boundary between the non-printing part and the printing part, whereby the character edges are blurred. The reason for this may be insufficient adhesion of the metal layer to the base layer since the conventional thermal recording medium comprises a base layer made of polyacrylate, polyurethane or vinyl chloride/vinyl acetate copolymer. When the vinyl chloride/vinyl acetate is used as the base material, it is decomposed to generate hydrogen chloride at a high temperature atmosphere of 60° C. or higher and corrodes the thermal recording layer.

When thermosensitivity of the recording layer is insufficient, the printing dot area becomes small or the printing density becomes low. Namely, the heat sensitivity of the recording layer has close relationship with heat conduction in a direction across the thickness of the metal film. When heat conduction in this direction is large, the heat sensitivity of the recording layer is high. Since the conventional thermal recording medium utilizes a simple metal substance of tin and the like and the thin metal film has low strength, the metal film tends to peel off or crack when it is heated with the thermal head, whereby sufficient heat sensitivity may not be obtained. In addition, as the recording medium can be heated to a temperature of 60° C. or higher with the heat applied to the metal layer to melt the simple metal substance of tin having a melting point of 232° C., the corrosion of metal thin film caused by the vinyl chloride/vinyl acetate copolymer used as the base material tends to be facilitated.

SUMMARY OF THE INVENTION

One object of the present invention is to provide a thermal recording medium in which a thin metal film as a recording layer has good adhesion to a base layer.

Another object of the present invention is to provide a thermal recording medium having an improved heat sensitivity of a thin metal film.

A further object of the present invention is to provide a thermal recording medium having improved storage stability.

According to the first aspect of the present invention, there is provided a thermal recording medium which comprises a base layer containing a resin having a functional group which chemically bonds with a metal having a low melting point and a thermal recording layer made of a thin film of a low melting point metal formed on the base layer wherein a part of the thermal recording layer can be heated to melt and be perforated to record information.

According to a second aspect of the present invention, there is provided a thermal recording medium which comprises a base layer and a thermal recording layer made of a thin film of a low melting point metal which comprises tin containing 0.01 to 42% by weight of lead formed on the base layer, wherein a part of the thermal recording layer when heated is melted and perforated record information.

The present invention is based on the following findings.

First, it has been found that good adhesion of a thin metal film to a base layer contributes to sharpness of the printed characters, namely prevents blur at the character edges, and good heat sensitivity of the metal film contributes to an increase in printing density and enlargement of the printing area.

Second, the printing clarity has been studied in connection with not only the properties of the metal film but also the properties of the base layer material and relationship between the properties of the thin metal film and the base layer material. In addition, the printing mechanism has been clarified in detail. It has been found that continuity of the thin metal film has some influence on the printing area and printing density, that good removal of the melt metal during printing contributes to the printing density since it is caused through disappearance of the part of thin metal film by agglomeration of molten metal with surface tension, and that such a property of the thin metal film that it has good adhesion to the base layer, but it can be smoothly removed from the base layer surface when molten which is desirable for sharpness of the characters and printing density.

Third, to create prints with good clarity after long-time storage of the thin metal film, it is useful to provide a protecting layer containing a resin having a functional group which chemically bonds with the low melting point metal whereby the printing is protected from heat, light, chemicals and water.

Fourth, to maintain the clarity of the print on the thin metal film for a long time, it is advantageous to add a resin having a functional group which chemically bonds with the low melting point metal to the base layer and to provide a magnetic recording layer on the other surface of the base layer, whereby the surface of the thermal recording layer is not damaged or degraded when contacted by a magnetic head for magnetic recording.

DETAILED DESCRIPTION OF THE INVENTION

The various causes for unclarity of the printing on the thermal recording medium can be removed by the present invention.

According to the present invention, the blur of the character edges can be prevented by the addition of a resin having a functional group which chemically bonds the low melting point metal to the base layer, whereby the adhesion of the metal film to the base layer is enhanced.

In the present invention, a tin-lead alloy is preferred as the low melting point metal in view of increase of strength of the metal film and adhesion of the metal film to the base layer, although other alloys such as tin-silver, tin-bismuth, tin-aluminum, tin-tellurium, tin-indium, tin-lead-bismuth, tin-lead-indium, tin-lead-bismuth, bismuth-indium, bismuth-indium-lead alloys may be used.

In case of the tin-lead alloy, 0.1 to 42% by weight of lead is preferably added to tin to form an eutectic structure. As a result, the thin metal film has large strength. Because of the increased strength and improved adhesion of the metal film, the film will not peel off or crack, heat conduction in the direction across the metal film thickness will improved so that the metal thin film is melt and agglomerated in a comparatively large area, whereby a small area of print dot or low printing density can be prevented.

To achieve the above effect, the most desirable composition of the tin-lead alloy is 100 to 3000 ppm of lead in tin. In this range, the heat conduction and thermal sensitivity are further increased. When the amount of lead is less than 100 ppm, the above effects are not achieved. When the amount of lead is larger than 3000 ppm, the control of the amount of lead in the metal thin film is rather difficult, and the composition tends to be unstable.

The printing area has a close relationship with the degree of melting of the metal thin film. As the area of metal thin film to be made molten increases, the printing area increases.

To melt the metal of the thin film in a larger area and form a small number of agglomerates so that light transmission is not shielded, it is desirable that the thin metal film has no cracks and is two-dimensionally continuous.

When the thin metal film is continuous and molten metal forms one melt mass, the molten metal forms one agglomerate due to strong surface tension. If the thin metal film is divided into sections by cracks and the like, the molten metal in each section will form independent agglomerates, so that small agglomerates are scattered in the printing area whereby light transmission through the printed part is prevented.

Therefore, it is preferred that the thin metal film be continuous. The continuity of the thin metal film can be evaluated by electrical resistance of the thin metal film. That is, the continuity of thin metal film can be controlled by adjusting the surface resistance. According to the observation by the present inventors, when the thin film of tin-lead alloy is continuous and has no cracks that create defects, it has surface resistance of about $1 K\Omega/\square$ or less. In case of other metal alloys, when the resistance is larger, the thin metal film is discontinuous and, when the resistance is small, the thin metal film has few cracks and is continuous. This relationship is generally found in the thin metal film irrespective of the kind of metal or alloys. It is surprising that the clarity of printing can be predicted from the evaluation of the continuity of the thin metal film through the measurement of electrical resistance.

The printing density relates to a degree of agglomeration of molten metal by the heating means such as a thermal head.

As the base layer material, any of the conventionally used plastics, such as nylon, cellulose diacetate, cellulose triacetate, polystyrene, polyethylene, polypropylene, polyester, polyimide, polycarbonate, polyethylene terephthalate and polyethylene naphthalate can be used.

In the present invention, the base layer material preferably has a functional group which chemically bonds with the low melting point metal. Examples of the material having the functional group are acrylic silicone resins and other types of resins comprising some kinds of metal elements such as titanium or silicon.

Preferably, the base layer contains a color pigment. Alternatively, the base layer is made transparent and formed on a coating containing the color pigment.

The coating containing the color pigment comprises, as a binder resin, a vinyl chloride/vinyl acetate copolymer, a cellulose resin, a polyvinyl butyral resin, a polyurethane resin, a polyester resin, an acrylic resin, a phenol resin or an isocyanate compound. Among them, the urethane resin, the vinyl chloride/vinyl acetate copolymer or the vinyl chloride resin having an acrylic hydroxyl group is preferably used as the coating having the color pigment in combination with the base layer comprising a resin containing a silane compound (e.g. Sailcoat manufactured by Tisso).

When heat resistance of the coating is required, the polyurethane resin is preferably used. When dispersibility of a color pigment in the resin is desired, the vinyl chloride/vinyl acetate copolymer is preferred. However, if the thermal recording medium is used at a temperature of about 80° C. for a long time, hydrogen chloride may be generated from the copolymer. In such case, the vinyl chloride resin having the acrylic hydroxyl group is particularly useful.

As the color pigment, those having color which can be visibly identified in contrast to the thin metal film are used. Examples of the color pigment are zinc oxide, titanium oxide, chrome yellow, cadmium yellow, α-ferric oxide, cadmium red, Prussian blue, Ultramarine, carbon black, benzidine yellow, Phthalocyanine Blue, Phodamine Lake, and the like. Among the color pigments, a black pigment is preferred in view of contrast. Also, a magnetic powder is preferred when the coloring and magnetic recording are effected simultaneously.

Preferably, the low melting point metal is expelled in the molten state from the surface of the base layer. Thereby, the printing clarity at a level of not more than 5000 particles of agglomerated low melting point metal per square millimeter in one dot at a printing energy of 45 mJ/mm$^2$ can be achieved.

To this end, the base layer resin has a thermal property that a flow temperature of the resin is lower than the melting point of the metal by at least 20° C. When the resin is selected according to this standard, melting error hardly occurs and printing with no error over the whole normal dot area is obtained easily. This is because, when the thermal recording medium is heated with the thermal head, greater the softness is of the base layer resin, the smaller are the mechanical resistance against agglomeration and deformation of the molten resin. Then, the molten metal is smoothly agglomerated.

The flow temperature of the base layer resin can be measured by observing the heated resin with a high temperature microscope. That is, the flow temperature can be recognized through change of appearance such as gloss of the thin metal formed on the base layer.

When the urethane resin or the vinyl chloride/vinyl acetate copolymer is used as the binder resin for the coating containing the color pigment and a resin containing a silane compound is used as the base layer resin, the printing quality is further improved.

The thin film of low melting point metal is formed by a conventional method such as vacuum deposition, plating or spattering.

The thermal recording medium of the present invention can be printed by a conventional manner. For example, a part of the thermal layer made of the thin film of low melting point metal is heated with heating means, such as the thermal head, the laser beam or hot stamping, whereby the heated part is made molten and perforated to produce printed information with high clarity.

On the thermal recording medium of the present invention, a protecting layer may be formed to protect the printed information from heat, light, chemicals or water.

The protecting layer is required to have various properties. First, the protective layer itself can prevent penetration of materials which corrode the thin metal film such as water or oxygen. Second, the protective layer is preferably heat resistant. Third, the protective layer has a mechanical strength to some extent and prevents the thin metal film from damage in daily use.

Silicone polymers are found to satisfy the above three requirements. Alternatively, the protecting layer may comprise two sub-layers, an inner one which chemically protects the thin metal film and an outer one which has mechanical strength and protects the thin metal film from damage.

In addition, when the protecting layer is formed directly on the thin metal film, it should reliably adhere to the thin metal film and should not interfere with the agglomeration of the molten metal.

To achieve good adhesion to the thin metal film, the protecting layer preferably has a sub-layer containing a functional group which chemically bonds with the low melting point metal.

To avoid the interference of agglomeration of the molten metal, the protecting layer should soften or flow at a temperature at which the metal agglomerates.

Preferably, the protecting layer formed directly on the metal thin film has the same properties as the base layer.

The protecting layer should be transparent to light.

When the base layer contains the functional group which chemically bonds with the low melting point temperature and the magnetic layer is formed on the side of the substrate opposite to the base layer side, the surface of the thermal recording layer is not damaged or deteriorated by rubbing with the magnetic head during magnetic recording, and printing with clarity is always kept.

PREFERRED EMBODIMENTS OF THE INVENTION

The present invention will be illustrated by the following Examples, in which "parts" and "%" are by weight unless otherwise indicated.

Various thermal recording media were produced and evaluated as follows.

I. Production of thermal recording media

A. Formation of a coloring layer

Barium ferrite powder having an average particle size of 0.8 μm (80 parts), a vinyl chloride/vinyl acetate copolymer having acrylic hydroxyl groups (VAGF manufactured by UCC) (10 parts), a polyurethane resin (Pandex T5201 manufactured by Dainippon Ink Chemical Co., Ltd.) (7 parts), a trifunctional polyisoeyanate compound (Colonate manufactured by Nippon Polyurethane Industries Co., Ltd.) (1 part), carbon black (4 parts), toluene (260 parts) and cyclohexanone (260 parts) were mixed and dispersed in a ball mill for 100 hours to prepare a magnetic paint.

On a polyethylene terephthalate film having a thickness of 188 μm, the prepared magnetic paint was gravure coated and dried to form a black coloring layer having a thickness of 15 μm.

B. Formation of a base layer

Each of four resins (i), (ii), (iii) and (iv) was dissolved in a mixed solvent of methyl isobutyl ketone, toluene and ethylcellosolve (1:1:1 by volume) and coated on the above prepared coloring layer and dried to form a base layer (i), (ii), (iii) or (iv).

(i) An acrylic resin (polymethyl methacrylate) having a flow temperature of 215° C.

(ii) An acrylic resin having a flow temperature of 205° C. with which a silane compound is copolymerized (Sailacoat manufactured by Tisso). This copolymer resin can form a siloxane bond with a metal through a hydrolysis reaction of the silane compound.

(iii) Polyurethane resin having a flow temperature of 240° C.

(iv) Polyurethane resin having a flow temperature of 220° C.

C. Formation of a thin film of low melting point metal

To a quantity of tin, lead was added in an amount of 50 ppm (a), 100 ppm (b), 300 ppm (c), 500 ppm (d), 0.3% (e), 2.0% (f), 5.0% (g), 10.0% (h) or 20.0% (i). Then, the mixture was made molten in a furnace and molded in the form of a pellet to obtain a metal sample a, b, c, d, e, f, g, h or i.

By using the metal sample as an evaporation source and a resistance heating type deposition apparatus (EBX-6 type manufactured by ULBAC), the metal was vapor deposited on each unheated base layer under reduced pressure of $10^{-5}$ Torr at a deposition rate of 50 Å/sec. to form a metal film of 900 Å in thickness. In total, 36 combinations of the base layer and the metal thin film were prepared.

The metal alloy composition in the thin film of the low melting point metal formed on the base layer (i) was analyzed. The percentages of lead in tin were 120 ppm (a), 300 ppm (b), 1500 ppm (c), 2500 ppm (d), 1.5% (e), 5% (f), 11% (g), 20% (h) or 40% (i). These results indicated that lead was concentrated in the metal thin films. The reason for the concentration of lead may be that lead has higher vapor pressure than tin and tin is dissipated.

The melting point of the formed metal thin film was 231° C. (a), 231° C. (b), 229° C. (c), 227° C. (d), 202° C. (e) or 183° C. (f to i).

The melting point was expressed in terms of a temperature at which the melting started in a differential scanning calorimeter. The melting point of pure tin measured by this method was 232° C.

With 36 samples, electrical resistance was measured by a four-probe method of the resistivity measurement by using a surface resistance meter at nine points in the deposited area of 130 mm × 130 mm, and the measured resistance values were averaged. The results are shown in Table.

D. Formation of a protecting layer

On the metal film surface of each of 36 samples produced in the step D, a coating paint having the same composition as the base layer paint (ii) was coated and dried to form an acrylsilicone resin having a thickness of 2 μm. On the acrylsilicone resin film, a UV light curable epoxy acrylate (V 5510 manufactured by Dainippon Ink) was coated to a dry thickness of 1 μm to form a double layer protecting layer to obtain 36 thermal recording media:
a-(i), a-(ii), a-(iii), a-(iv);
b-(i), b-(ii), b-(iii), b-(iv);
c-(i), c-(ii), c-(iii), c-(iv);
d-(i), d-(ii), d-(iii), d-(iv);
e-(i), e-(ii), e-(iii), e-(iv);
f-(i), f-(ii), f-(iii), f-(iv);
g-(i), g-(ii), g-(iii), g-(iv);
h-(i), h-(ii), h-(iii), h-(iv);
i-(i), i-(ii), i-(iii), i-(iv).

As a reference sample, a thermal recording medium (sample No. j) was produced in the same manners as above but using pure tin for forming a metal thin layer and an acrylic resin for forming a base layer.

In the same manners as in the production of the sample No. j but using the same amount of the vinyl chloride/vinyl acetate copolymer (VAGH manufactured by UCC) or a polyester resin (Vilon 200 manufactured by Toyobo) in place of the vinyl chloride/vinyl acetate copolymer having acrylic hydroxyl groups (VAGF manufactured by UCC), a thermal recording medium (sample No. k or sample No. l, respectively) was produced.

In the same manners as in the production of the sample No. j but forming a film of the vinyl chloride/vinyl acetate (VAGH manufactured by UCC) having the same thickness in place of the film of the acryl silicone resin, a thermal recording medium (sample No. m) was produced.

II. Evaluation of the thermal recording media
E. Printing test

On each of 40 thermal recording media, characters were printed with a thermal printing type magnetic card reader writer (KUA-501 manufactured by Kyushu Matsushita Electric) by using a thin film type thermal head with a dot density of 8 lines/mm and a dot size of 120 × 120 μm² at a printing energy of 45 mJ/mm².

F. Evaluation of printing quality

The printing density was evaluated by measuring a so-called optical density with the Macbeth RD 915 type density meter. The printing density was measured in a square printed area of 3 mm square (24 dots × 24 dots) and an average density including the non-printed area between dots was obtained.

The printing density was evaluated according to the following criteria:
OO: Optical density larger than 1.0
O: Optical density of 0.7–1.0
Δ: Optical density of 0.5–0.7
X: Optical density of 0.35–0.5
XX: Optical density smaller than 0.35.

The sharpness of characters was evaluated by visually observing the blur at the character edges and nonuniformity of density.

The sharpness of characters was evaluated according to the following criteria:
OO: Substantially no blur or nonuniformity
O: A few blurs and nonuniformities
Δ: Many blurs and nonuniformities
X: A great number of blurs and nonuniformities.

The number of particles of molted and agglomerated metal was counted with an optical microscope at 400 time magnitude.

TABLE

| Sample No. | Printing density | Sharpness of character | Surface resistance (kΩ/□) | Number of metal particles (No./mm²) |
|---|---|---|---|---|
| a-(i) | Δ | Δ | 40 | — | 8000 |
| a-(ii) | O | OO | 1 | 5000 |
| a-(iii) | X | Δ | 100 | 8000 |
| a-(iv) | X | X | 100 | 9000 |
| b-(i) | O | O | 1 | 4500 |
| b-(ii) | O | OO | 0.5 | 3000 |
| b-(iii) | O | Δ | 5 | 5000 |
| b-(iv) | Δ | X | 30 | 6000 |
| c-(i) | O | O | 0.05 | 4000 |
| c-(ii) | OO | OO | 0.01 | 2500 |
| c-(iii) | Δ | Δ | 2 | 5500 |
| c-(iv) | Δ | X | 15 | 6000 |
| d-(i) | O | O | 0.01 | 2800 |
| d-(ii) | OO | OO | 0.002 | 2000 |
| d-(iii) | O | O | 0.8 | 4800 |
| d-(iv) | Δ | X | 5 | 5700 |
| e-(i) | O | O | 0.005 | 2500 |
| e-(ii) | OO | OO | 0.002 | 1800 |
| e-(iii) | O | O | 0.5 | 4300 |
| e-(iv) | Δ | X | 3 | 5200 |
| f-(i) | O | O | 0.004 | 2200 |
| f-(ii) | OO | OO | 0.001 | 1500 |
| f-(iii) | O | O | 0.3 | 3900 |
| f-(iv) | Δ | Δ | 2 | 4800 |
| g-(i) | O | O | 0.003 | 2000 |
| g-(ii) | OO | OO | 0.001 | 1300 |
| g-(iii) | O | O | 0.2 | 3600 |
| g-(iv) | Δ | Δ | 1 | 4400 |
| h-(i) | O | OO | 0.003 | 2000 |
| h-(ii) | OO | OO | 0.001 | 1200 |
| h-(iii) | OO | O | 0.2 | 3500 |
| h-(iv) | Δ | Δ | 1 | 4300 |
| i-(i) | O | OO | 0.003 | 1900 |
| i-(ii) | OO | OO | 0.001 | 1000 |
| i-(iii) | OO | O | 0.2 | 3300 |
| i-(iv) | Δ | Δ | 1 | 4200 |

TABLE-continued

| Sample No. | Printing density | Sharpness of character | Surface resistance (kΩ/□) | Number of metal particles (No./mm²) |
| --- | --- | --- | --- | --- |
| j | XX | X | >$10^4$ | >10000 |
| k | XX | X | >$10^4$ | >10000 |
| l | XX | X | >$10^4$ | >10000 |
| m | XX | X | >$10^4$ | >10000 |

As understood from the results in Table, the 36 samples a-(i) to i-(iv) were excellent in the printing density since they comprised the metal thin layer of tin containing lead as the thermal recording layer. Among them, the 16 samples a-(i) to d-(iv) had good reproducibility and stability.

Among the samples, those using the base layer (ii) had better sharpness of characters.

Among the sample, a-(ii), b-(i), b-(ii), c-(i), c-(ii), d-(i), d-(ii), d-(iii), e-(i), e-(ii), e-(iii), f-(i), f-(ii), f-(iii), g-(i), g-(ii), g-(iii), g-(iv), h-(i), h-(ii), h-(iii), h-(iv) i-(i), i-(ii), i-(iii) and i-(iv) had the surface resistance of less than 1 kΩ/□ and also good printing density and sharpness of characters.

It can be seen that when the number of metal particles was smaller, the printing conditions were better.

Further, the sample Nos. j, k, l and m were stored at 80° C., 90% RH for 10 days, and color change of the metal thin films was observed. The results are as follows:

| Sample No. | Color change of metal thin film |
| --- | --- |
| j | No |
| k | Yes |
| l | No |
| m | Yes |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thermal recording medium which comprises a base layer and a thermal recording layer formed on said base layer, said thermal recording layer made of a film of a low melting point metal which comprises tin containing 0.01 to 42% by weight of lead, such that when a part of the thermal recording layer is heated with a thermal head it melts and perforates to record information.

2. The thermal recording medium according to claim 1, wherein said tin contains 500 to 3000 ppm of lead.

3. The thermal recording medium according to claim 1, wherein said base layer contains a color pigment.

4. The thermal recording medium according to claim 3, wherein said color pigment is a magnetic powder.

5. The thermal recording medium according to claim 1, wherein said base layer is transparent and formed on a coating containing a color pigment.

6. The thermal recording medium according to claim 5, wherein said coating containing said color pigment comprises a resin of polyurethane or a copolymer of vinyl chloride and vinyl acetate, and said base layer comprises a resin containing a silane compound.

7. The thermal recording medium according to claim 5, wherein said coating containing the color pigment comprises a vinyl chloride resin having an acrylic hydroxyl group, and said base layer comprises a resin containing a silane compound.

8. The thermal recording medium according to claim 5, wherein said color pigment is a magnetic powder.

9. A thermal recording medium which comprises a base layer and a thermal recording layer comprising a film of a low melting point metal formed on said base layer, wherein said film of low melting point metal has a continuity in terms of a surface resistance of not larger than 1 kΩ/□ such that when selectively heated it melts and perforates to record information.

10. The thermal recording medium according to claim 9, wherein said base layer contains a color pigment.

11. The thermal recording medium according to claim 10, wherein said color pigment is a magnetic powder.

12. The thermal recording medium according to claim 9, wherein said base layer is transparent and formed on a coating containing a color pigment.

13. The thermal recording medium according to claim 12, wherein said coating containing said color pigment comprises a resin of polyurethane or a copolymer of vinyl chloride and vinyl acetate, and said base layer comprises a resin containing a silane compound.

14. The thermal recording medium according to claim 12, wherein said coating containing said color pigment comprises a vinyl chloride resin having an acrylic hydroxyl group, and said base layer comprises a resin containing a silane compound.

15. The thermal recording medium according to claim 12, wherein said color pigment is a magnetic powder.

16. A thermal recording medium which comprises a resin base layer and a thermal recording layer comprising a film of a low melting point metal formed on said base layer, wherein said resin forming said base layer has a flow temperature lower than a melting point of said low melting point metal by at least 20° C. such that when said thermal recording layer is selectively heated, the heated part melts and perforates to record information.

17. The thermal recording medium according to claim 16, wherein said base layer contains a color pigment.

18. The thermal recording medium according to claim 17, wherein said color pigment is a magnetic powder.

19. The thermal recording medium according to claim 16, wherein said base layer is transparent and formed on a coating containing a color pigment.

20. The thermal recording medium according to claim 19, wherein said coating containing the color pigment comprises a resin of polyurethane or a copolymer of vinyl chloride and vinyl acetate, and said base layer comprises a resin containing a silane compound.

21. The thermal recording medium according to claim 19, wherein said coating containing the color pigment comprises a vinyl chloride resin having an acrylic hydroxyl group, and said base layer comprises a resin containing a silane compound.

22. The thermal recording medium according to claim 19, wherein said color pigment is a magnetic powder.

* * * * *